United States Patent
Piazza et al.

[11] Patent Number: 6,026,438
[45] Date of Patent: Feb. 15, 2000

[54] DYNAMIC WORKSTATION CONFIGURATION PROCESSOR

[75] Inventors: Frank Piazza, Medford; David Olhasso, Somerset, both of N.J.

[73] Assignee: Merrill Lynch & Co., Inc., New York, N.Y.

[21] Appl. No.: 08/962,306

[22] Filed: Oct. 31, 1997

[51] Int. Cl.$^7$ .............................................. G06F 15/177
[52] U.S. Cl. .......................................... 709/221; 709/220
[58] Field of Search ...................... 707/200; 395/200.51, 395/200.52, 200.53, 200.54, 200.55; 705/35, 38; 709/220, 221, 222; 713/1, 100

[56] References Cited

U.S. PATENT DOCUMENTS

| | | |
|---|---|---|
| 4,346,442 | 8/1982 | Musmanno . |
| 4,376,978 | 3/1983 | Musmanno . |
| 4,597,046 | 6/1986 | Musmanno et al. . |
| 4,674,044 | 6/1987 | Kalmus et al. . |
| 4,700,297 | 10/1987 | Hagel, Sr. et al. . |
| 4,774,663 | 9/1988 | Musmanno et al. . |
| 5,270,922 | 12/1993 | Higgins . |
| 5,297,032 | 3/1994 | Trojan et al. . |
| 5,475,819 | 12/1995 | Miller et al. ...................... 395/200.03 |
| 5,612,898 | 3/1997 | Huckins ............................... 364/514 R |
| 5,666,534 | 9/1997 | Gilbert et al. ........................... 395/651 |
| 5,671,363 | 9/1997 | Cristofich et al. . |
| 5,734,831 | 3/1998 | Sanders ............................. 395/200.53 |
| 5,764,593 | 6/1998 | Turpin et al. ........................... 395/652 |
| 5,765,144 | 6/1998 | Larche et al. . |
| 5,781,654 | 7/1998 | Carney . |
| 5,819,042 | 10/1998 | Hansen ............................. 395/200.52 |
| 5,826,243 | 10/1998 | Musmanno et al. . |
| 5,832,503 | 11/1998 | Malik et al. ............................ 707/104 |
| 5,838,907 | 11/1998 | Hansen .............................. 395/200.5 |
| 5,845,078 | 12/1998 | Tezuka et al. ..................... 395/200.52 |
| 5,860,012 | 1/1999 | Luu ........................................ 395/712 |
| 5,890,141 | 3/1999 | Carney et al. . |

OTHER PUBLICATIONS

Two-page excerpt describing an Install System distributed by IBM for its AIX System, dated 1995.

*Primary Examiner*—Paul Kulik
*Attorney, Agent, or Firm*—HopGood, Calimafde, Kalil & Judlowe LLP

[57] ABSTRACT

A system and protocol for implementing large scale installation of operating and user configuration data in essentially unattended fashion. The enhanced system design allows for greatly simplified system configuration, including protocols to insure user mobility between configured systems.

14 Claims, 8 Drawing Sheets

DYNAMIC WORKSTATION CONFIGURATION PROCESSOR

FIELD OF THE INVENTION

The present invention generally relates to computer systems and processing methods for controlled installation and upgrade of highly specialized computer workstations, servers, and their environment in an automated fashion. More particularly, the present invention relates to a specific computer install control system, established protocols and the governing programming that is capable of automated configuration of many individual computer workstations and servers creating a network environment having a broad collection of user profiles, proprietary/3rd party applications, and operating system characteristics.

BACKGROUND OF THE INVENTION

The advent of the personal computer has revolutionized the working environment in the last ten years by giving individuals unprecedented ability to process data and perform sophisticated analysis. In recent years, the capabilities and power of the PC on the desktop has been amplified several orders of magnitude by the development of advanced networking techniques that link together computers into rings of shared information and communication. Together, these developments have changed the way business is done.

To take advantage of these new capabilities, companies have hired large staffs of computer experts to implement and maintain the new systems that are sprouting up in headquarters, regional offices, and home offices. Desktop computers are complicated devices with a wide range of device requirements, operating system attributes, and application settings that must be configured to insure proper performance. Indeed, most computers today are linked together into a network that demands select communication protocols, organizational structures, passwords, and the like for successful operation. In addition, desktop computers include connections to printers, scanners, modems, data cards, etc. each of which implicates a range of specialized system settings to allow operation. Added to this is the collection of individual software applications that typically populate most workstations—such as word processors, spreadsheets, and database tools. And, of course, some companies rely on select proprietary software installed on each machine. See, specifically, U.S. Pat. No. 5,878,258, incorporated herein by reference.

The foregoing discussion delineates multiple computers at a site, each of which represents a complex mix of software and hardware from a variety of vendors. Under these circumstances, it is not surprising to find that most computers take significant time to set up in the first place—often requiring the services of a highly skilled PC expert. For example, it is difficult to install a new application onto a PC workstation in under 20 minutes. Assuming twenty separate applications, install time will often extend beyond six hours. Thereafter, as the system is upgraded to include new software or hardware, the delicate balance in the initial setup is at some risk.

The above efforts of system setup and upgrade are magnified for offices with multiple workstations. Indeed, by the time the PC expert finishes configuring all the workstations in a typical office, the original PC is likely obsolete and the applications initially installed all need upgrading. This would be an enormous chore.

Recognizing these issues, there have been several efforts to automate the install process and to provide homogenous creation of workstation platforms in an automated fashion. Some of these are commercially available, such as the WinStall product distributed by Seagate. Others reflect proprietary efforts that have not been disclosed to the public or commercially distributed. This includes the prior PRISM system used by Merrill Lynch for its DOS based workstations during the past decade. In general, these systems provided an enhanced capability to create the requisite workstation platform with minimal customized support for each installation. This, of course, translated to substantial savings when multiplied by the number of new systems that must be brought to operating status in a given year.

Recent operating system advances and increases in network communication capabilities has established a pressing need for greater automated configuration and installation facilities. This is particularly true in the Windows NT environment which is now growing in importance. Its now becoming particularly common to have branch offices utilizing a local area network—LAN—to support data distribution amongst the various employees and activities undertaken at the local office. In this arrangement, depicted graphically in FIG. 1, the branch office LAN includes at least two servers and a plurality of separate but interconnected workstations. In addition, this arrangement is linked via per se well-known communications bridge to a separate wide area network—WAN—either privately supported ("intranet") or part of a public access network, such as the Internet. As depicted in FIG. 1, a number of separate LANs, for each branch office, are placed in the WAN and configured to be in communication with other members of their network.

These networks are supported by separate network operating system—NOS— and support services. To insure proper configuration and enhanced maintenance, it is important to have each of the nodes (workstations) on the network conform to one of a small set of hardware specifications, and configure each in a uniform manner. Using the same hardware components for each workstation insures that once it is debugged, the workstation configuration will be repeated without problems to identical hardware.

The foregoing system demands have created a difficult situation where expansions and upgrades to computer systems require enormous commitment of time and effort of skilled PC experts, simply to configure the new arrangements to insure proper operation. It was with this understanding of the problems of the prior art that formed the impetus to create the present invention.

OBJECTS AND SUMMARY OF THE PRESENT INVENTION

It is, therefore, an object of the present invention to provide a data processing system to automate the creation of the software platform for the custom configuration of workstations, servers, and users.

It is a further object of the present invention to provide an integrated program controlled system for implementing remote and automated configuration of servers, workstations, and users in accordance with pre-set criteria.

It is still another object of the present invention to provide a stored program known as the "profiler" which is capable of establishing the appropriate settings for both the operating system and applications for a LAN of plural workstation platforms.

It is still another object of the present invention to provide system programming and operating logic to the process of upgrading one or more PC workstations with newer versions of software.

It is another object of the present invention to provide User profile information accessible to the workstation platform in accordance with the specific User parameters for the user logged on to operate that particular workstation.

It is another object of the present invention to create and update individual User profile information independently of the User's workstation.

The above and other objects of the present invention are realized in an integrated computer system for managing the installation and upgrading of multiple PC based workstations, servers, and users. In this context, the system provides the controlling logic commands and implementations to install a full software operating system and select applications onto a factory fresh computer; this is accomplished in essentially unattended fashion. In addition, the system performs operating system and application updates—also in essentially unattended fashion. This is supplemented by the use of a dedicated centralized facility for storing individual workstation, server, and user parameters.

The system has, as a first property, a module to perform the initial Server's workstation build. This involves the local use of a special boot disk and the interconnection to a specific install support computer that has stored thereon for select use an application known as the Profiler. The boot disk is customized for the particular hardware environment that needs to be configured into a select workstation platform. The boot disk also performs the necessary programming steps to permit installation of the operating system with a pre-defined set of operating system control parameters. The use of multiple custom boot disks permits the use of several different hardware platforms including servers and laptops.

The profiler application tool (profiler exe) operates to build the directory structure and creates individual files representing user, server, and workstation specific data.

Once the operating system is in position, a custom profile of applications are implemented to complete the install of the user's system. This is accomplished by taking a master configuration file, known as a "Curvers" file, and implementing this file in conjunction with stored system data to create the new local environment. (Multiple curver files are used, each with a targeted objective.)

In accordance with the varying aspects of the present invention, the system permits upgrades in combination with new installs, using a before/after driving logic. In particular, the system characterizing files for operating workstations and servers are recorded creating an initial configuration "snapshot" of the computer and then stored on that computer as a Curvers file. For an update, an updated version of this system is then created on one machine and a new curvers file of the salient system characterizing data is created. This curvers file is then transferred to the workstation and then compared with the stored existing curvers file, and implements the differences between these two curvers files.

The foregoing features of the present invention will become better understood by review of the following detailed description of a specific illustrative embodiment thereof, taken in conjunction with the appended figures, of which:

DETAILED DESCRIPTION OF THE INVENTION

First briefly in overview, the present invention is fundamentally directed to providing network creation, recovering, and updating as an unattended IS (Information Services) function. Accordingly, two separate but highly interrelated processes have been developed. The first process is directed to implementing system creation. This involves creating select media, interconnected associated hardware, and running a program that drives a custom install for all components within a network environment.

The second process of interest is directed to system modifications. The exemplary modifications include the updating of applications on the system, the change to new hardware or role, the movement of users between workstations, and the recovery from a system failure.

To accomplish these objectives, the inventive system provides several modes of operation each of which is guided by a fundamental operative philosophy. In particular, the invention applies "state" theory wherein ultimate operating characteristics are a function of the attributes of their current state, but independent of the path taken to achieve this state. Specifically, two workstations may take completely different paths to a final configuration, but once there, will be governed by the same environmental settings. Application of these principles involve use of a programmed controlled system and a set of software tools, the core features of which permit the unattended creation and upgrading of the select network properties.

With the foregoing overview in mind, attention is first directed to the series of figures delineating system structure as it relates to these various modes of operation. The first mode of operation involves creating the initial state for the system. This will reflect the current selection of operating system, proprietary applications, and third party (shrink wrap) applications. It will also include select user profile information that will govern that user's interaction on the resulting network—including access codes for select levels of security.

Figure 1:
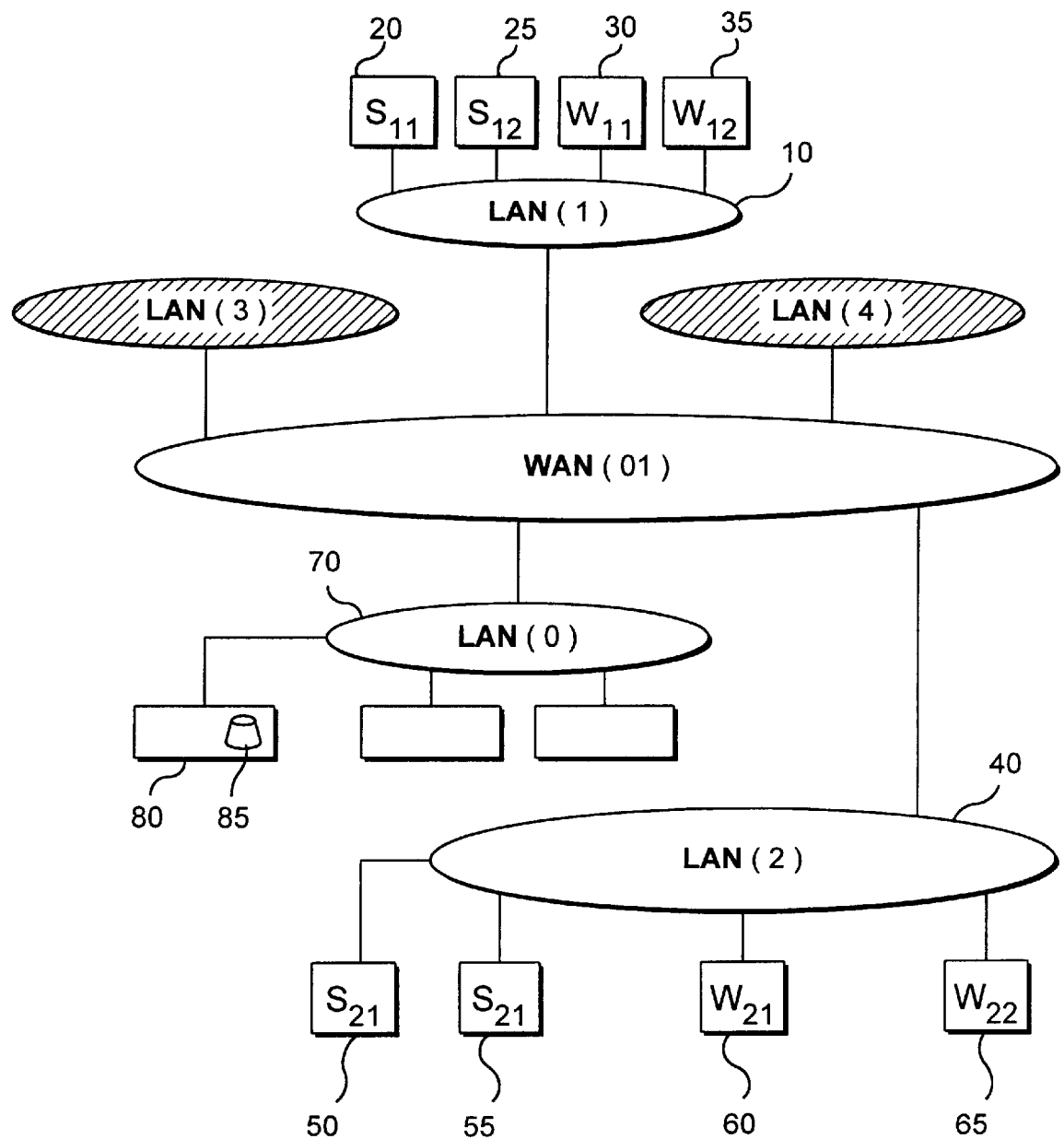
FIG. 1 provides a functional block diagram for an exemplary network system.

The environment of concern is generally depicted in FIG. 1 and includes two (or more) separate local area networks (LANs) interconnected by a wide area network (WAN). In particular and with reference to FIG. 1, the generic LAN 10 is one of many existing or new network branch offices within the set domain. In the example presented here, the operating system for the network is a Microsoft Windows NT environment with the domain set established under the NT parameters. Accordingly, the various branch offices have select identifying protocols to allow domain wide administration.

LAN 10 is one of many LANs on the WAN each linked by known communication bridges and further linked to the administration LAN 70. In addition, the administration network includes a management server 80, with a proprietary application known as the Profiler. The profiler data store 85 includes custom files having extensions of the form file. uxt and file.txt containing select environment data for nodes and branches within the governed domain. These files are much like the "ini" files typically found in a Windows system environment, wherein select control parameters are separately stored for access during run time. The profiler also encapsulates the functionality otherwise found in certain tools typically incorporated with NT, such as USER Manager and Server Manager. Please see Microsoft Windows NT Resource Kit, for Windows NT Workstation, and Windows NT Server, Ver. 3.5, 2nd Ed. (1995), published by Microsoft Press, One Microsoft Way, Redmond, Wash., a program guide which is incorporated by reference, as if restated in full. A sample profiler data store (in directory format) is presented below:

TABLE 1

PROFILER DATA STORE

WKTMPL (Share)
    LOA001 (Branch)
        W001.TXT (Workstation)
        R001.TXT (Remote Workstation)
        DEFA.TXT (Branch Settings)
        S001.TXT (Server)
        DAVE.UXT (User)
    LOA002

Within LAN (1) itself, a plurality of separate and interconnected workstations, W(12), 30 and W(12), 35 reside, with the number often extending into the hundreds. Each workstation has a separate name, such as L0A001W001 and is associated with local servers S(11), 20 S(12), 25, respectively. The governing server will have name L0A001S001. Under this labeling, the first six characters reflect the branch code, and the following four characters identify the node. The foregoing is applicable in a number of different communication regimes, and is exemplified here under a TCP/IP (transmission control protocol/Internet protocol) regimen.

Creation of a new LAN is accomplished remote from the actual office, as the separate computers are configured utilizing special configuration software and data. In particular, the main LAN server is configured, which is then used to program the individual workstations. Accordingly, the server is provided with the necessary tools and applications to separately build the workstations and these include the files (application executables), the curver files (explained in detail below), the NT install package, and the service pack for NT. These applications are provided to the server on the distribution CD (compact disk) pre-configured in accordance with the process depicted in FIG. 2 below. In addition, the branch server supporting the LAN build is provided the source install data for all nodes (i.e., servers, workstations, and users) from the CD and specifically, the SRINST and WSINST directories on the CD. These two directories are copied from the CD onto the server.

These directories include all source files to install NT and all files specified in the CURVER files. Two directories are used to separate workstation files from server files.

TABLE 2

BUILD DIRECTORY

Server Drive
    SRINST
    WSINST

The actual system install is accomplished using the following steps. First the server is programmed by using the data from the distribution CD. Server install parallels that described below for the workstation, with the exception that DHCP is not used, the operating system (here NT) is directly taken off the distribution CD and the contents of the distribution CD are copied into the above two directories, SRINST and WSINST.

Thereafter the workstations are connected to the Server and rebooted with a special boot disk (floppy). This boot disk is particular to the hardware, such as the network cards, etc. For example, if the workstation is a Pentium® class computer with a Maxtor® hard drive and a Number Nine® video card, parameters corresponding to the build of this hardware configuration are part of the boot disk files. It will also include the necessary boot files such as command.com and io.sys, typically found in a MS-DOS® system.

To install, the boot disk is "booted" and the "install" command entered on the command line with the workstation name as the argument. The system then loads the DOS network client and obtains a DHCP TCP/IP address; (dynamic host configuration protocol), and connects to the profile server to access the data control file specific to this workstation.

Next, the system copies the data control file (e.g., W001.TXT) to profile.txt file containing the requisite build information and then builds an NT "answer" file. The NT answer file contains the default values to instruct NT on its install from the server to the workstation—without user intervention. In particular, the answer file includes the necessary parameters taken from the profile.txt file and the hardware specifications from the boot disk to guide the NT install program. The actual build of NT on the workstation is accomplished by starting a standard NT unattended install from the WSINST Directory on the Server.

Thus, the server is first built by accessing the requisite file from the system CD, while the actual workstations are built from the files stored on the now constructed server. This becomes the pattern for building LANs within a single NT domain.

Figure 2:
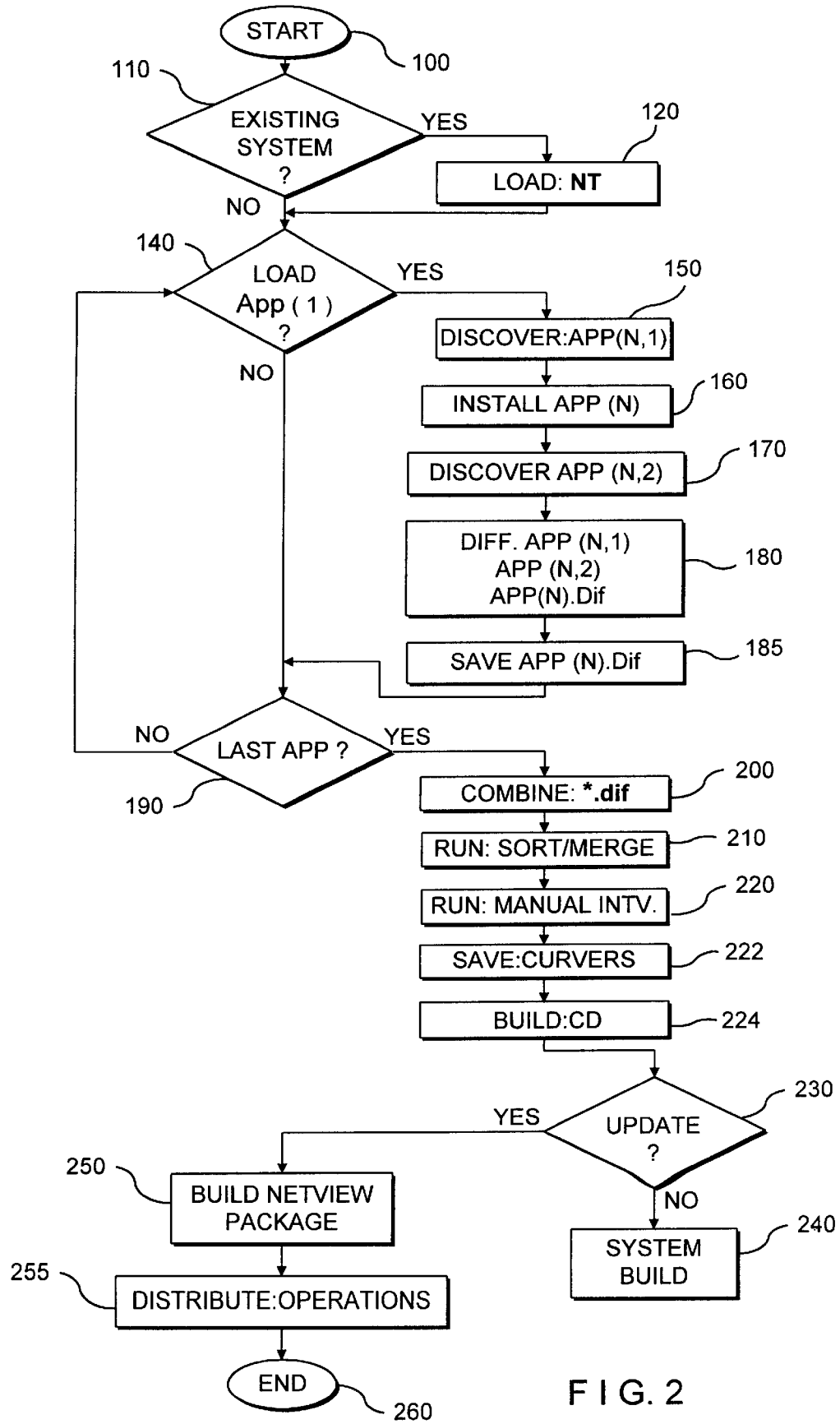
FIG. 2 provides a logical flow chart diagram of the Install support creation system and related process.

The packaging process for generating the above-noted distribution CD is generally depicted in FIG. 2 in logic flowchart form. This process involves the actual installation of individual applications and examination of the system before and after each install. Logic conceptually begins at Start block 100 and continues to test 110 which determines if the operating system is needed. If an initial operating system build is required, a positive response to test 110 branches logic to block 120.

The system then supports the discover process for characterizing machine state. In particular, freezes the key configuration settings (e.g., the registry files, any ini files, and the like). This snapshot is then stored as *.dis, and used as the initial "state" for any subsequent changes.

The discover files have a unique format, wherein information is sectioned and the overall structure reflects a particular hierarchy. provided below:

EXAMPLE OF DISCOVER FILE

| @@@Registry | <group level> |
| [key] | <section> |
| value = data | <leaf> |

Thus, the discover tool of the present invention converts the system snapshot into the foregoing file with groups comprising files, ini, services, and registry.

The tool, Diff.exe contrasts the elements of the system configuration data before and after the install. This is accomplished by taking the before and after "snapshots," in the form of *.dis files and calculating the difference therebetween. This is exemplified in the following table showing the before install discover file, A.dis. and the after install discover file B.dis.

Example—Diff.exe

| A.DIS | B.DIS | AB.DIF |
|---|---|---|
| @@files | @@files | @@files |
| [c:\Dave] | [c:\Dave] | [c:\Dave] |
| AA:exe = $V_1$ | AA.exe = $V_2$ | AA.exe = $V_2$ |
| AB.exe = X | AB.exe = X | --AC.exe-- |
| AC.exe = Y | AD.exe = Z | AE.exe = Q |
| AD.exe = Z | AE.exe = Q | |

Focusing on the "files" group, the difference in applications is recorded in the AB.dif file, which notes both the addition of the new file, AE.exe and the removal of an old file, AC.exe.

Continuing with FIG. 2, at test 140 the first of the applications is considered for inclusion in the build. As stated earlier, it is expected that dozens of separate applications will be included with each build. Each of these must be assessed to determine the configuration settings needed to implement the application installation. This is accomplished incrementally, via test 140. A positive response triggers the sequence depicted in blocks 150–185, wherein the specifics of the current machine state are discovered at block 150 and stored as APP(N,I). At block 160, the new application is installed and a second discovery file generated, block 170, recording the system configuration files that result from the installation process. This second discover file is APP(N,2). Thereafter, the system determines the system differences after the application installation by contrasting the APP(N,I) file with APP(N,2); this resulting in what is called a Diff file, block 180. This is saved as APP(N).dif at block 185. This is repeated for each application, at test 190. The system creates all of the discover and diff files, for each one of N applications, and then creates a single Curvers file by aggregating the individual diff files, through block 200 into the controlling curvers file.

This curvers file is, however, incomplete and needs several alterations before final use. The curver file differs from the discover files in that the curver files include the above group level and two additional levels—hardware ID and role:

| Base Curver Format |
|---|
| @@@@ role |
| @@@ hardware ID |
| @@ files |

The resulting curvers file is then sorted, block 210 and several manual interventions introduced at block 220. This Curver file in combination with the actual executables of the application becomes the predicate for the initial installation or update as determined by test 230. At this juncture, the Curver files will be used in conjunction with the NET-VIEW® software for system upgrades, block 250, or used in initial system builds via CD, block 240.

The foregoing flow implicates several important considerations in implementation. To begin with, the process depends significantly on whether the application was designed in house with close conformation to standards for internal use, or if the application is a shrink wrap version of commercial product—this latter circumstance creating potential install concerns. The system design and implementations to address these issues are delineated in the next sequence of Figures.

Figure 3A:
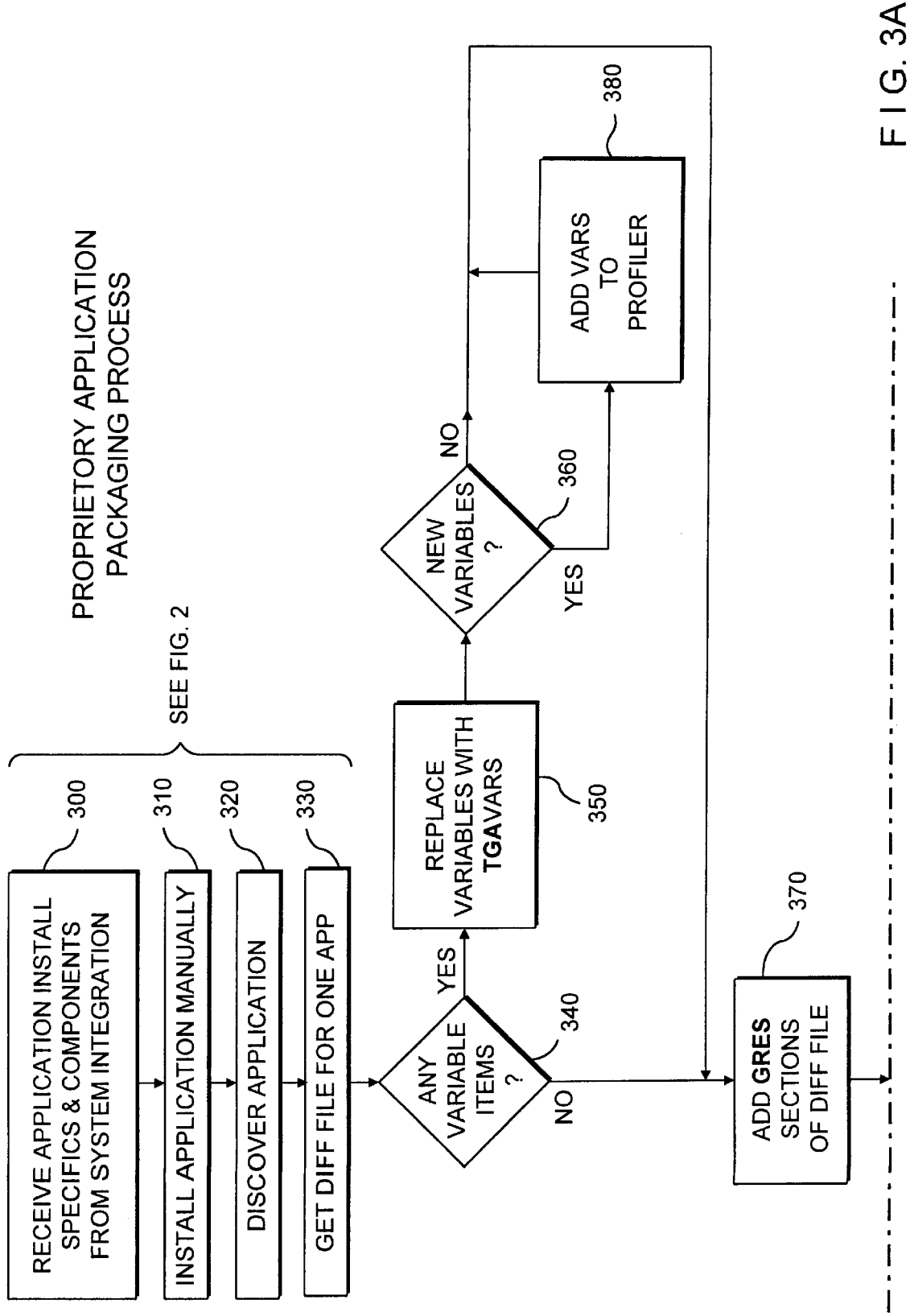
FIGS. 3A and 3B provide a logical flow chart regarding the system creation process, proprietary applications.
Figure 3B:
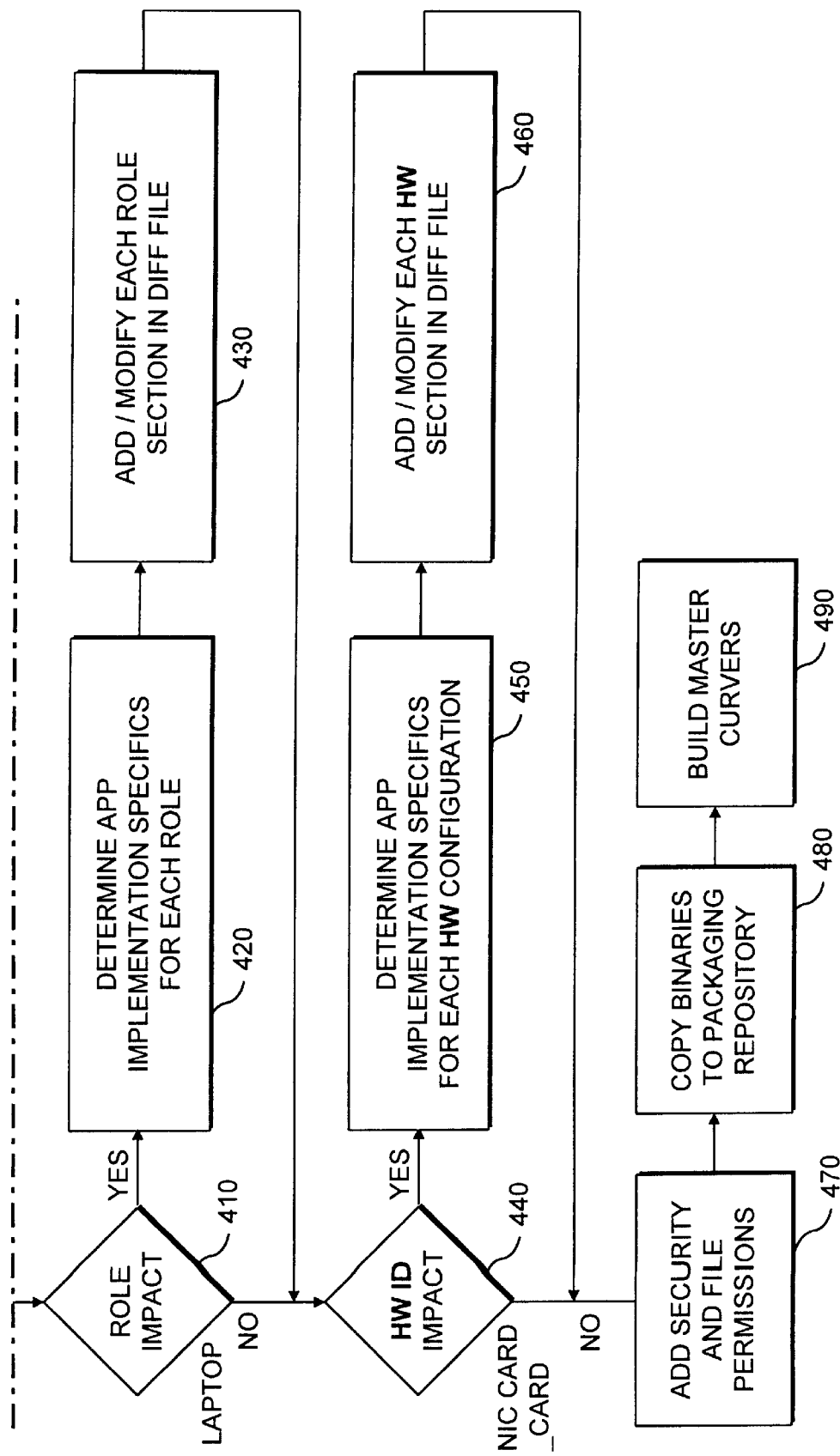

Turning now to FIG. 3, the foregoing logic is expanded to express system operation on proprietary applications, beginning with the new application identified for addition to the workstation platform, block 300 and installed at 310. The resulting system file changes are then discovered, 320, by taking a snapshot of the new files, which is stored as a Diff file, block 330.

At test 340, the system determines whether there are any variables within the Diff files. In this context, the variables are listed as TGA_VAR although the nomenclature is not critical. If variables exist, the corresponding TGA_VARS are manually added into the Diff file, block 350.

Continuing with FIG. 3A, test 360 determines if new variables have been added to the Diff file, i.e., variables not part of the profiler. If so, these variables are then added to the profiler, block 380. At block 370, all manual section entries are added to the Diff file. This includes the GRES, PROC, and Attrib components. PROC comprises the parameters that support spawning another program (as identified) during the install process. For example, this section will permit spawning the unattended install for Microsoft® SQL Server®. The Attrib sets the file level attributes, e.g., "read only," "hidden," and "system". The GRES section includes those parameters necessary to replace variables in an unformatted text based file.

One aspect of the system build is the role that the computer will have—is it a laptop, desktop, etc.; many applications don't care about the role and thus their installation is transparent to this segment of the curver file. To the extent the application is impacted by "role," the configuration data is stored in this level. At test 410, the system determines if the new application will impact the role section of the Diff file. If so, the system measures this impact, block 420, and then modifies the role section of the Diff file, block 430.

Similarly, the hardware impact is tested at 440. This includes the different hardware types such as network cards and sound cards. In parallel with the 10 above, the application on the hardware section of the Diff file is measured, block 450 and then used to modify this section of the Diff file, block 460.

The final segment of this process for each discover is the addition of any NT security control parameters, block 470 with all binaries copied to the packaging repository, block 480. The final step involves building the master curvers file from the above manipulations.

Curver files are generally used to configure workstations. An exemplary master curver file is presented below:

EXAMPLE 1—CURVER FILE

```
#TITLE = Example Base Curver File
@@@@ALL
@@@ALL
@@FILES
[C:\WINNT4]
IsUninst.exe = 314368,1997\3\24,17:42:56,5.00.200.0
uninst.exe = 299008,1996\11\5,16:13:22,2.20.920.0
[C:\WINNT4\Profiles\All Users\Start Menu\Programs\Accessories\Hyperterminal]
HyperTerminal.lnk = 592,1997\8\8,13:37:32,
@@GRES
[Copy]
E:\Services\AOST\SetTime.bat
@@INI
@@PROC
[FULL]
a = E:\Services\AOST\SetTime.bat
@@REGISTRY
[HKEY_CURRENT_USER\Software\Microsoft\Windows\
CurrentVersion\Telephony\Cards]
"NextID" = dword:00000017
"NumEntries" = dword:00000017
[HKEY_CURRENT_USER\Software\Microsoft\Windows\
CurrentVersion\Telephony\Cards\Card0]
"Flags" = dword:00000001
"ID" = dword:00000000
"InternationalRule" = ""
"LDRule" = ""
"LocalRule" = ""
"Name" = "None (Direct Dial)"
"Pin" = ""
@@SERVICES
[MSSQLServer]
272,3,1,E:\Services\SQL60\BINN\SQLSERVR.EXE,,LocalSystem,MSSQLServer
[SQLExecutive]
16,3,1,E:\Services\SQL60\BINN\SQLEXEC.EXE,,LocalSystem,SQLExecutive
@@SHARE
[BMS]
Print = E:\Services\BMS\Print
```

The foregoing process reflected the install of conforming (in-house) applications. Not all "shrink wrapped" applications conform to these specifications, and these will require a different approach. An example of one such application is Microsoft® SQL Server® which creates a custom database at install time and is thus not a valid candidate for this system. To resolve these installation issues, the system invokes a manual engineering effort that may require creation of select script files and the like.

The above discussion focused on the install creation process, i.e., the creation of the software configuration codes on CD to allow unintended LAN system installation, starting with initial server configuration. Implementation of this process on a workstation level may be better understood by reference to FIG. 4, recognizing that the server install is analogous to this process.

Figure 4:
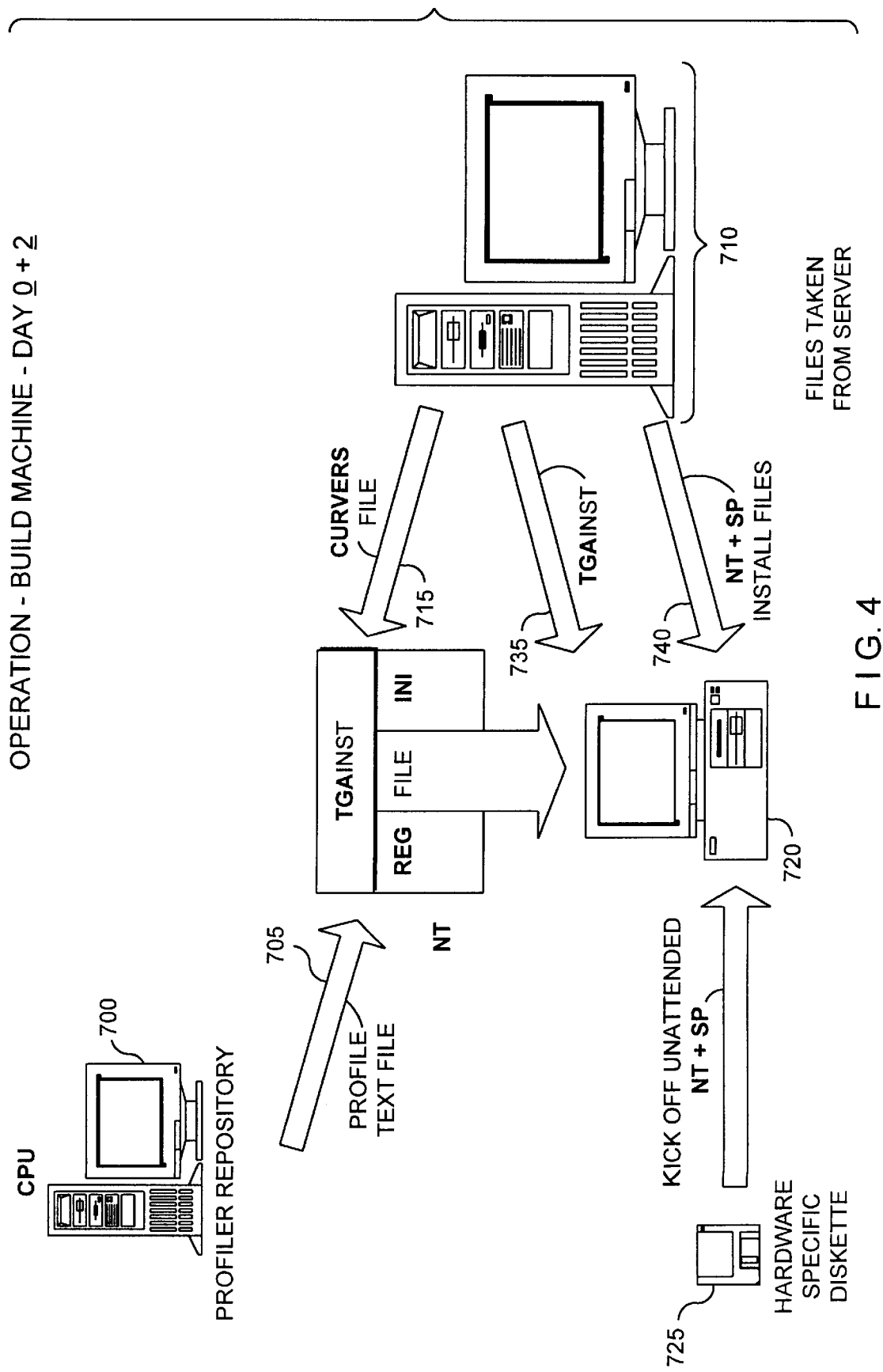
FIG. 4 provides a system schematic depicting the present invention.

In FIG. 4, the process of building a fresh workstation, 720, (or updating an existing workstation with new software) is depicted. In this scenario, the network server for the branch office, 710, is connected to the remote central server, 700 (70 in FIG. 1). For an initial install, the workstation is booted with the kick-off disk, 725, for loading the operating system (here NT) from the server 710, via transfer of these specific files (including service paks) via path 740.

Once the operating system is in place, an install tool called TGAINST is applied to connect the profile data, 705, and the curvers file, 715, for that system into the controlling configuration for that workstation. In particular, TGAINST creates the local registry, ini files, security, services, etc. directly from the curvers and profile data, and loads these entries on the workstation. In addition, TGAINST transfers the actual application executable files, 735, from their repository on the branch server (i.e., WSINST directory), 710, and places these onto the workstation at the appropriate hard drive location.

If the workstation is undergoing an update, the TGAINST program merely contrasts the old existing WCURVER file with the new WCURVER that was created reflecting the configuration parameters for the update. TGAINST then applies the changes between the two WCURVER files to the machine.

FIG. 4 provides a general representation of the operation of the install program, TGAINST. In fact, there are three separate install programs, each applied to a separate type of curvers file all generically referred to as TGAXINST. These, however, include server install, TGASINST, user install TGAPINST, and workstation install TGAINST.

Figure 5:
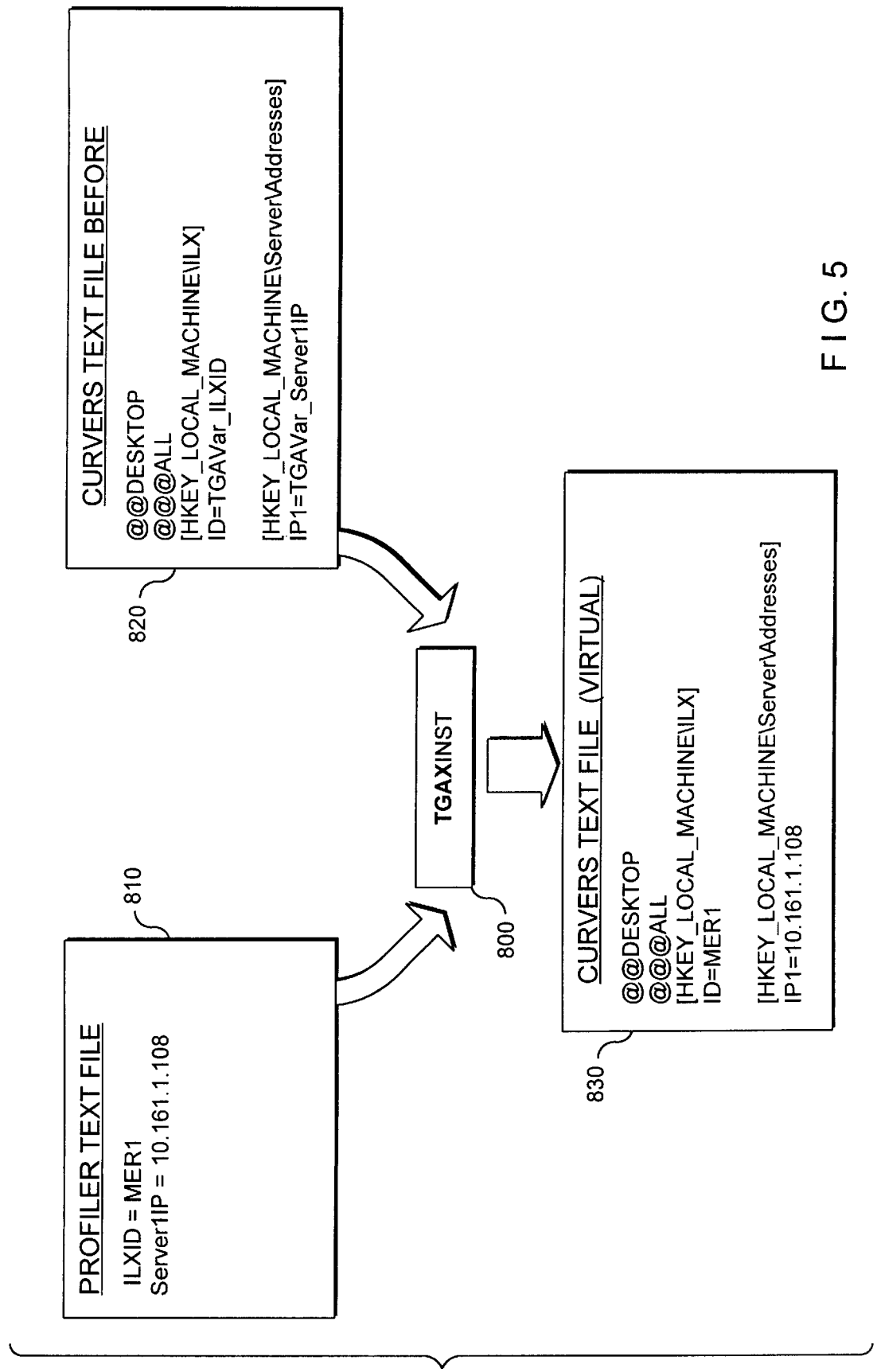
FIG. 5 provides a schematic on the system implementation of curver files.

Use of TGAXINST applied to a curvers file comprising variable entries, TGA_VARS, is depicted in FIG. 5. In this example, the variables are:

1. ILXID=TGAVAR_ILXID
2. SERVER1IP=TGAVAR_Server1IP

These variables are replaced during the install by the values stored in the Profiler Text file, 810, via TGAXINST, 800, on the curvers file, 820. The resulting curvers file (virtual; the file is actually processed line-by-line) is found at 830.

Importantly, the system applies NT networking support and specifically the use of a home directory and NT Profile for each system user in the domain. The generic structure for this directory which resides on one server in each branch, is depicted below:

TABLE 3

GENERIC HOME DIRECTORY

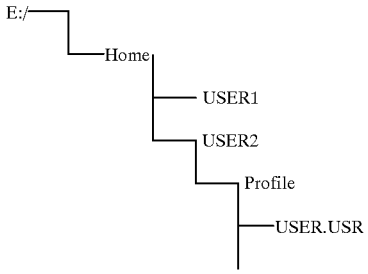

Within the Home directory for each user in the domain, USER1, the system retains important configuration files relevant to the USER1 preferences and the like, and independent of any particular workstation. This will document personal templates, address book, contact list, and other personal data. Specifically, under Profile in the home directory, file USER.USR (in NT 4.0, this file is called NTUSER.DAT) stores all USER specific registry entries which is defined as HKEY_CURRENT_USER whenever a user logs onto a workstation.

Traditionally, USER.USR data was only entered onto the workstation while a USER was logged on and then uploaded by NT to the home directory when the USER logged off. The difficulty with this method is that it requires actual individual USERS to log on to each workstation to load software and configure USER.USR. This is unacceptable for unattended updates involving more than a handful of machines at a time.

The present invention avoids this problem by treating USERs as separate nodes (similar to workstations) which breaks the requirement that the USER is configured during a software install on a workstation. This is accomplished by applying TGAPINST to the PCURVER file on the server which contains the home directory.

Specifically, TGAPINST operates on the branch server, containing the home directory, by attaching each USER's USER.USR file to the server's registry and then applying the registry entries from the PCURVER file to the attached USER.USR file. TGAPINST also creates the USER's default home directory, including files, ini, etc. and sets permission allowing the USER and only the USER access. PCURVERS file is created by removing all references to HKEY_CURRENT_USER and all references to the home directory from the previously generated workstation Diff files.

Significant flexibility results from this arrangement. For example, because USER data is not created during workstation install, each workstation remains generic and available to all USERS; this allows for a mismatch between the number of USERS and workstations.

Figure 6:
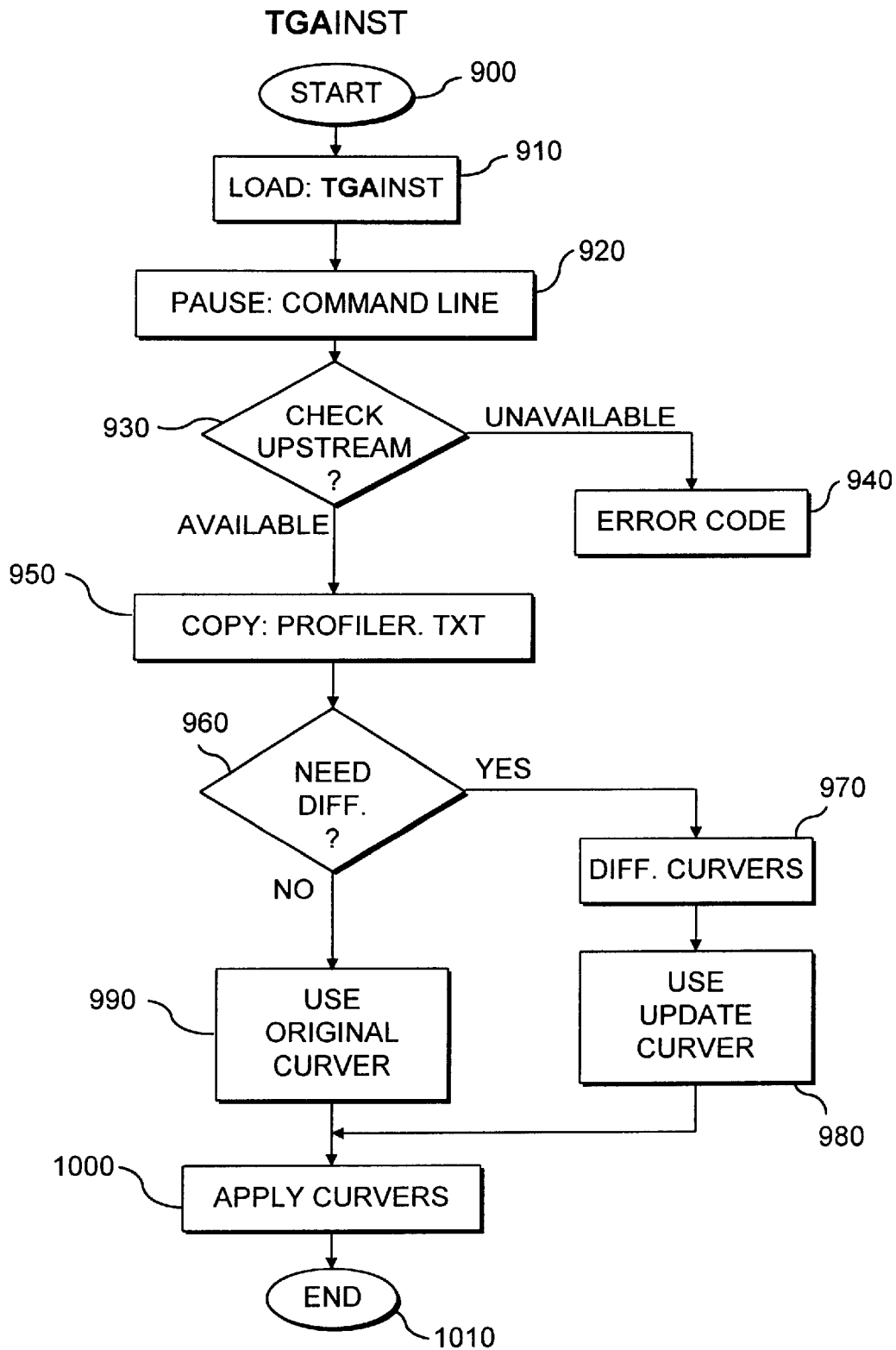
FIG. 6 provides a logic flow diagram of TGAINST and TGASINST.

Turning now to FIG. 6, the logic for the TGAINST TGASINST processes are depicted. After start block 900, the system loads the executable TGAINST, block 910 and parses its command line for run time arguments, block 920. These may include location of SRINST directory, name of install server, logging value, debug value, etc.

At test 930, the system confirms all requisite resources are available, e.g., resources allowing access to remote servers and the like. If available, logic continues to block 950 which copies the Profile.txt onto the machine from the profile server.

At test 960, the system determines whether a Diff (between old, current, and new Curvers files) is needed. If yes, logic branches to block 970, and the two Curvers files are dynamically contrasted (Diff) and the output Curver file captured. If no Diff required ("No" to test 960), then the new Curver file is captured. At block 1000, the captured Curver file is applied and logic terminates at block 1010.

Figure 7:
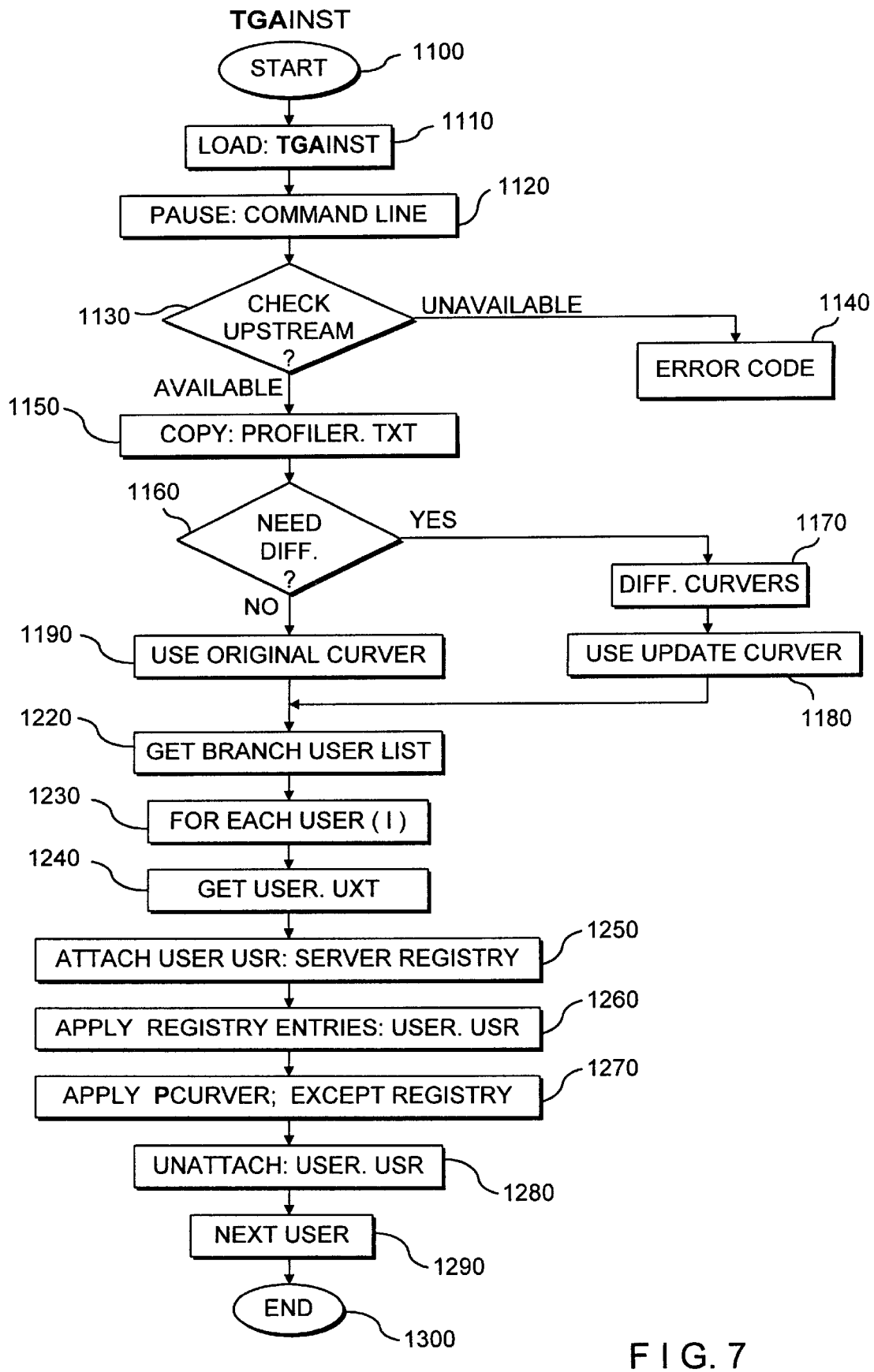
FIG. 7 provides a logic flow diagram of TGAPINST.

Turning now to FIG. 7, the logic governing the TGAPINST operation is depicted. After start block 1100, the sequence replicates that presented in blocks 900 to 990 of FIG. 6 with the same procedure. Starting at block 1220, however, TGAPINST departs from that depicted in FIG. 6, as the system obtains the branch USER list (i.e., identified by the first six characters identifying the branch).

At block 1230, the processing loop is initiated for each USER(I), taken incrementally, and at block 1240, the USER.USR is taken from the Profiler server and the variables therein cached in system memory. At block 1250, the USER.USR is attached to the server registry. This is accomplished via an API call delineating the file attachment to the registry.

At this point, the registry entries from the PCURVERS file are applied to the attached USER.USR file, block 1260. At block 1270, the remainder of the PCURVERS entries are applied to the USER'S home directory (stored on the server). The last step is decoupling the USER.USR file from the registry and indexing to the next USER in the loop.

After completing all USER'S, process terminates. Although the invention has been described in detail for the purpose of illustration, it is to be understood that such detail is solely for that purpose and that variations can be made therein by those skilled in the art without departing from the spirit and scope of the invention.

What is claimed is:

1. A method for building a configuration control file for a computer system comprising the steps of:

a. placing an operating system onto an existing computer;

b. iteratively installing individual applications and creating a discovery file for each application comprising machine state information after application install;

c. iteratively creating a curver file by aggregating plural application diff files formed by contrasting information stored in successive discover files;

d. sorting and/or merging said curver file and correcting errors in curver file entries; and e. storing said curver file in a storage medium.

2. The method of claim 1 further comprising the use of variables, TGA_VAR entries, within one or more diff files.

3. The method of claim 1 wherein said curver file includes a "Role" section delineating use of the machine.

4. The method of claim 1 further comprising a manual intervention step for entering installation instructions for select applications.

5. In combination with a system for controlling an install process for configuring plural computer platforms wherein said configuration includes operating characteristic files for server and/or workstation operation, comprising: means for establishing baseline configuration data for multiple platforms, including the creation of one or more curver files containing configuration data delineating system state wherein said system applies curver files using data from a central profile repository; means for taking configuration file data from a single install operation and establishing a basic install protocol for configuring plural other computers in accordance with said configuration file data, wherein said install process is path independent; and means for implementing the install of said configuration data corresponding to individualized USER profiles on said plural platforms.

6. A computer software installation and updating system for operation in a network environment, comprising:

a. means for running a profile executable to act on a profiler data store;

b. means to configure a central server with operating system and applications, including placing workstation install programs on a server directory;

c. means to configure a plurality of workstations connected to said server including collectively treating workstations and USERS as separate nodes within said network; and d. means for iteratively creating state specific curver files for each workstation.

7. The system of claim 6 wherein said means for running a profile executable includes said data store of select environmental data for network nodes and branches within the governed domain.

8. The system of claim 7 wherein communication between said server and plural workstations include a TCP/IP regimen.

9. The system of claim 8 wherein said means to configure a central server includes creation of a NT Answer file.

10. The system of claim 8 wherein separate install applications govern workstation, server, and USER profile data installation.

11. The system of claim 6 includes means for creating an install or update file by iteratively creating interim install state diff files.

12. In a data processing system for controlling and maintaining a network that includes workstations, servers, and individual USERs, said system comprising:

a. a configuration state processor for creating a configuration state curver file for each of said workstations, servers, and USERS, collectively considered "nodes";

b. a configuration compare processor for contrasting a current configuration state curver file with a curver file for said nodes; and c. application update processor for adding or updating applications to said nodes and reconfiguring said nodes in accordance with an updated curver file, wherein USER specific data is created separate from said workstation install or update.

13. The system of claim 12 wherein diff files are iteratively created capturing the impact on configuration for successive application installs or system updates.

14. The system of claim 13 wherein said diff files are aggregated in one or more curver files.

* * * * *